United States Patent
Oh et al.

(10) Patent No.: US 9,256,307 B2
(45) Date of Patent: Feb. 9, 2016

(54) TOUCH PANEL

(71) Applicant: SAMSUNG ELECTRO-MECHANICS CO., LTD., Suwon (KR)

(72) Inventors: Sang Hwan Oh, Suwon (KR); Youn Soo Kim, Suwon (KR); Ho Joon Park, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 139 days.

(21) Appl. No.: 13/658,740

(22) Filed: Oct. 23, 2012

(65) Prior Publication Data
US 2014/0049485 A1 Feb. 20, 2014

(30) Foreign Application Priority Data
Aug. 16, 2012 (KR) .................. 10-2012-0089486

(51) Int. Cl.
*G06F 3/041* (2006.01)
(52) U.S. Cl.
CPC ...... *G06F 3/041* (2013.01); *G06F 2203/04112* (2013.01)

(58) Field of Classification Search
USPC ............... 345/156–184; 178/18.01–20.04
See application file for complete search history.

(56) References Cited

U.S. PATENT DOCUMENTS

| | | | |
|---|---|---|---|
| 2003/0011577 A1* | 1/2003 | Katsuki et al. | 345/173 |
| 2010/0123670 A1* | 5/2010 | Philipp | 345/173 |
| 2010/0164889 A1* | 7/2010 | Hristov et al. | 345/173 |
| 2011/0102361 A1* | 5/2011 | Philipp | 345/174 |
| 2011/0102370 A1* | 5/2011 | Kono et al. | 345/174 |
| 2012/0062250 A1* | 3/2012 | Kuo | 324/686 |
| 2013/0234974 A1* | 9/2013 | Guard | 345/174 |

FOREIGN PATENT DOCUMENTS

KR  10-2011-0120157  11/2011

\* cited by examiner

*Primary Examiner* — Jason Olson
*Assistant Examiner* — Sosina Abebe
(74) *Attorney, Agent, or Firm* — NSIP Law

(57) ABSTRACT

Disclosed herein is a touch panel, including: a transparent substrate; an electrode formed in a mesh pattern on the transparent substrate; and a wiring formed in a wavy pattern on the transparent substrate and connected to the electrode, the wiring having curve shape of first peaks and second peaks alternately continuing along a longitudinal direction.

8 Claims, 9 Drawing Sheets

F1 F2 F3

TOUCH PANEL

CROSS REFERENCE TO RELATED APPLICATION

This application claims the benefit of Korean Patent Application No. 10-2012-0089486, filed on Aug. 16, 2012, entitled "Touch Panel", which is hereby incorporated by reference in its entirety into this application.

BACKGROUND OF THE INVENTION

1. Technical Field

The present invention relates to a touch panel.

2. Description of the Related Art

With the development of computers using a digital technology, devices assisting computers have also been developed, and personal computers, portable transmitters and other personal information processors execute text and graphic processing using a variety of input devices such as a keyboard and a mouse.

While the rapid advancement of an information-oriented society has been widening the use of computers more and more, it is difficult to efficiently operate products using only a keyboard and mouse currently serving as an input device. Therefore, the need for a device that is simple, has minimum malfunction, and is capable of easily inputting information has increased.

In addition, current techniques for input devices have progressed toward techniques related to high reliability, durability, innovation, designing and processing beyond the level of satisfying general functions. To attain these objects, a touch panel has been developed as an input device capable of inputting information such as text, graphics, or the like.

The touch panel is mounted on the display surface of an image display device such as an electronic organizer, a flat panel display including a liquid crystal display device (LCD), a plasma display panel (PDP), an electroluminescence (El) element or the like, or a cathode ray tube (CRT), so that a user selects the desired information while viewing the image display device.

The touch panel is classified into a resistive type touch panel, a capacitive type touch panel, an electromagnetic type touch panel, a surface acoustic wave (SAW) type touch panel, and an infrared type touch panel. These various types of touch panels are adapted for electronic products in consideration of signal amplification problems, resolution difference, level of difficulty of designing and processing technologies, optical characteristics, electrical characteristics, mechanical characteristics, environment-resistant characteristics, input characteristics, durability, and economic efficiency. Currently, a capacitive type touch panel and a digital resistive type touch panel have been used in a wide range of fields.

An example of the capacitive type touch panel of the prior art is shown in Korean Laid-Open Publication No. 10-2011-0120157. In the touch panel disclosed in the above published patent, a plurality of electrodes are formed on a transparent substrate while having biaxial direction and crossing each other.

In addition, wirings are formed at one ends of the plurality of electrodes such that the wirings are electrically connected to the electrodes. A flexible printed circuit board (FPCB) is electrically connected to pad parts formed on terminals of the wirings.

In the touch panel having the above structure according to the prior art, the electrodes are disposed in an active area of a transparent substrate, which is exposed to the outside through the transparent substrate or a window glass, and the wirings are disposed in a non-active area of the transparent substrate, which is not exposed to the outside.

The reason that the wirings are disposed in the non-active area is that the wiring is generally linear, and thus, does not have pattern uniformity with the electrodes disposed in the active area of the transparent substrate.

In other words, in the case where the electrodes are formed in a mesh pattern, the linear wirings and electrodes have uniform patterns. Therefore, when the electrodes and wirings are formed together in the active area, visibility of the touch panel becomes defective.

Due to this, the touch panel of the prior art has wirings disposed in the non-active area of the transparent substrate, like the touch panel disclosed in the published patent above.

In the structure of the touch panel of the prior art, the wirings are disposed in the non-active area of the transparent substrate, and thus, the width of the non-active area of the touch panel is disadvantageously enlarged.

This disadvantage becomes an obstacle to miniaturize terminal devices employing the structure of the touch panel, or causes the active area of the transparent substrate, which is a touch area, to be reduced as compared with the same sized devices.

SUMMARY OF THE INVENTION

The present invention has been made in an effort to provide a touch panel, capable of reducing the area of a non-active area by disposing wirings and electrodes in an active area of the transparent substrate.

Further, the present invention has been made in an effort to provide a touch panel having improved visibility by forming electrodes and wirings to have a uniform pattern on the transparent substrate.

According to a preferred embodiment of the present invention, there is provided a touch panel, including: a transparent substrate; an electrode formed in a mesh pattern on the transparent substrate; and a wiring formed in a wavy pattern on the transparent substrate and connected to the electrode, the wiring having curve shape of first peaks and second peaks alternately continuing along a longitudinal direction.

The electrode may be formed in the mesh pattern where the same shape of parallelogram patterns are continuously arranged, each of column patterns of the electrode being composed of a plurality of parallelogram patterns continuously arranged in a first direction so that first diagonal lines in the first direction of the parallelogram patterns continue on the same line.

The wiring may be disposed adjacent to a first column pattern of the electrode and be lengthily formed in the first direction.

The first peak of the wiring facing toward the first column pattern of the electrode may be directly connected to one vertex positioned close to the wiring, of vertexes that are positioned in a direction of a second diagonal line of the parallelogram patterns.

Here, a width between the first peaks of the wiring may be equal to a width of the first diagonal line of the parallelogram pattern.

The electrode and the wiring may be formed of the same material and integrally formed.

The transparent substrate may be demarcated into an active area and a non-active area, and the electrode and the wiring may be formed in the active area.

According to another preferred embodiment of the present invention, there is provided a touch panel, including: a transparent substrate; an electrode array formed in a mesh pattern on the transparent substrate and demarcated into a first electrode and a second electrode by a cut portion formed in the mesh pattern; and a wiring array formed in a wavy pattern on the transparent substrate and including a first wire and a second wire each having curve shape of first peaks and second peaks alternately continuing along a longitudinal direction, the first wiring being connected to the first electrode and the second wiring being connected to the second electrode.

The first electrode and the second electrode may be disposed in a longitudinal direction while the cut portion is formed in a width direction in the mesh pattern.

The first electrode and the second electrode each may be formed in a mesh pattern where the same shape of parallelogram patterns are continuously arranged, column patterns of the first electrode and column patterns of the second electrode each being composed of a plurality of parallelogram patterns continuously arranged in the longitudinal direction so that first diagonal lines of the parallelogram patterns continue on the same line in the longitudinal direction.

Here, a first column pattern of the first electrode and a second column pattern of the second electrode may be formed on the same line.

The first wiring may be lengthily formed in the longitudinal direction while being disposed adjacent to the first column pattern of the first electrode, and the second wiring may be lengthily formed in the longitudinal direction while being disposed adjacent to the first column pattern of the second electrode.

Here, a width between the first peaks of each of the first wiring and the second wiring may be equal to a width of the first diagonal line of the parallelogram pattern.

The first peak of the first wiring facing toward the first column pattern of the first electrode may be directly connected to one vertex facing toward the first wiring, of vertexes of the parallelogram patterns constituting the first column pattern of the first electrode.

The first peak of the second wiring facing toward the first column pattern of the second electrode may be directly connected to one vertex facing toward the second wiring, of vertexes of the parallelogram patterns constituting the first column pattern of the second electrode.

The transparent substrate may have a neighboring section where the first wiring and the second wiring are disposed in parallel with each other and adjacent to each other.

Here, in the neighboring section, the second peaks of the first wiring and the first peaks of the second wiring may be separated from each other while facing each other.

Here, in the neighboring section, a distance of a straight line connecting the first peak of the first wiring and the second peak of the second wiring may be equal to a width of the second diagonal line of the parallelogram pattern, and a direction of the straight line connecting the first peak of the first wiring and the second peak of the second wiring may be identical to a direction of the second diagonal line of the parallelogram pattern disposed facing toward the direction of the straight line.

The electrode array and the wiring array may be formed of the same material and integrally formed.

The transparent substrate may be demarcated into an active area and a non-active area, and the electrode array and the wiring array may be formed in the active area.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
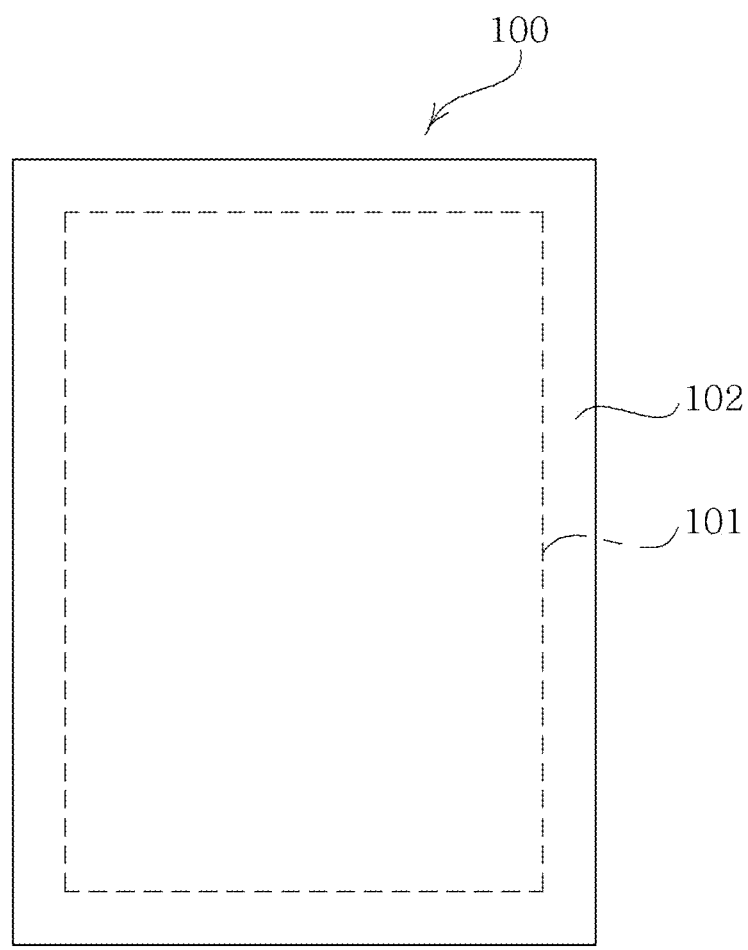
FIG. 1 is a plane view showing a transparent substrate of a touch panel according to a first preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

Figure 2:
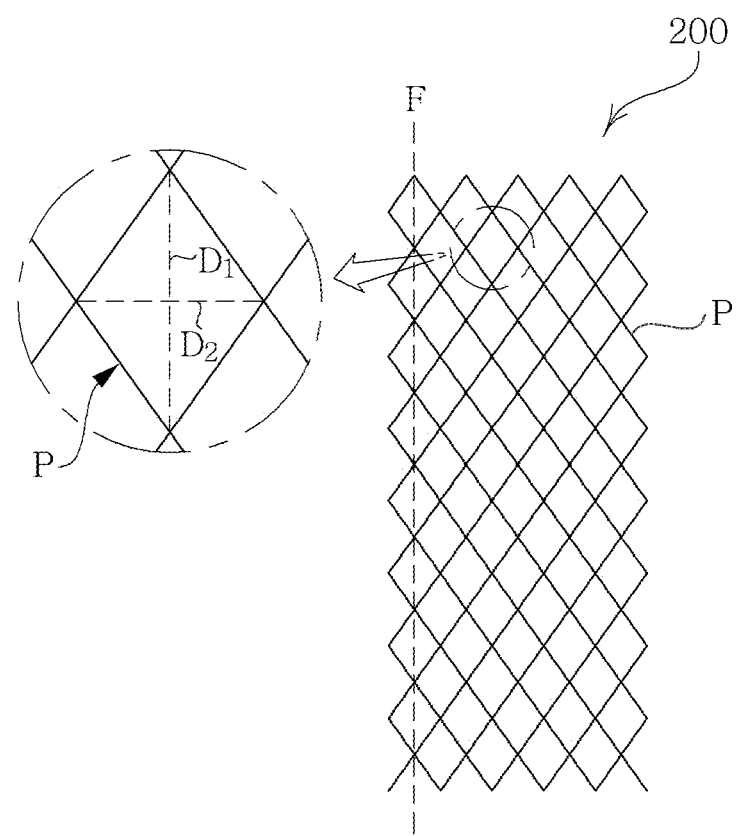
FIG. 2 is a plane view showing an electrode of the touch panel according to the first preferred embodiment of the present invention.
Figure 3:
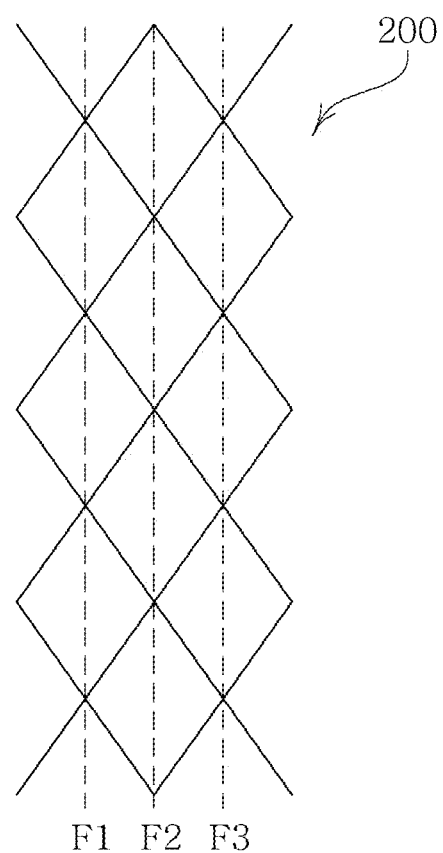
FIG. 3 is a main part enlarged view of the electrode shown in FIG. 2.
Figure 4:
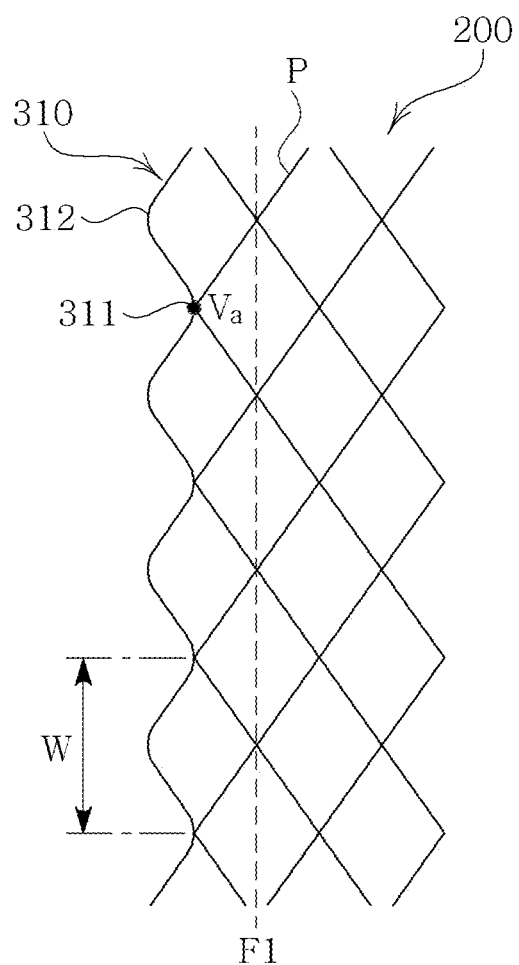
FIG. 4 is a main part plane view showing a structure where a wiring is connected to the electrode shown in FIG. 2.

FIG. 1 is a plane view showing a transparent substrate of a touch panel according to a first preferred embodiment of the present invention; FIG. 2 is a plane view showing an electrode of the touch panel according to the first preferred embodiment of the present invention; FIG. 3 is a main part enlarged view of the electrode shown in FIG. 2; and FIG. 4 is a main part plane view showing a structure where a wiring is connected to the electrode shown in FIG. 2.

As shown in FIGS. 1 to 4, a touch panel according to a first preferred embodiment of the present invention may include a transparent substrate 100, an electrode 200 formed in a mesh pattern on the transparent substrate 100, and a wiring 310 formed in a wavy pattern on the transparent substrate 100 and connected to the electrode 200, the wavy pattern having curve shape of first peaks 311 and second peaks 312 that alternately continue along a longitudinal direction.

The transparent substrate 100 serves to provide an area in which the electrode 200 and the wiring 310 are to be formed. The transparent substrate 100 needs to have support force capable of supporting the electrode 200 and the wiring 310 and transparency capable of allowing a user to recognize an image provided by an image display device.

Considering the above-described support force and transparency, the transparent substrate 100 may be made of polyethylene terephthalate (PET), polycarbonate (PC), poly methyl methacrylate (PMMA), polyethylene naphthalate (PEN), polyethersulfone (PES), a cyclic olefin polymer (COC), a triacetylcellulose (TAC) film, a polyvinyl alcohol (PVA) film, a polyimide (PI) film, polystyrene (PS), biaxially oriented polystyrene (BOPS; containing a K resin), glass, or tempered glass, but is not necessarily limited thereto.

Meanwhile, the transparent substrate 110 may be a window provided at the outermost side of the touch panel. In the case where the transparent substrate 100 is the window, since the electrode 200 is formed directly on the window, a process of forming the electrode 200 on a separate transparent substrate 100 and then attaching the transparent substrate 100 to the window is omitted, and the entire thickness of the touch panel may be reduced.

The transparent substrate 100 may be demarcated into an active area 101 and a non-active area 102 disposed outside the edge of the active area 101, as shown in FIG. 1. The active area 101 is an area where a touch function by a user is implemented, and a screen area in which motion scenes of the touch panel are visibly recognized by the user. In addition, the non-active area 102 is an area that is covered by a bezel part (not shown) having black or white color and formed at the edge of the transparent substrate 100 or the window, to thereby not be exposed to the outside.

The electrode 200 serves to generate a signal when being touched by a user, so that the touched coordinates can be recognized by a controller (not shown). The signal generated from the electrode 200 is transmitted to the controller (not shown) through the wiring 310 to be described below.

The electrode 200 is formed in a mesh pattern on the transparent substrate. The mesh pattern constituting the electrode 200 may be, for example, such hat the same shape of parallelogram patterns P are continuously arranged as shown in FIG. 2. FIGS. 2 and 3 show an example where the parallelogram pattern P has a diamond shape. However, in the parallelogram pattern P, the lengths of four sides are not necessarily equal.

Column patterns (F) of the electrode 200 may be composed of a plurality of parallelogram patterns P continuously arranged in a first direction, for example, a longitudinal direction in FIG. 2. Here, when the column pattern F is formed, the plurality of parallelogram patterns P are continuously arranged in the first direction such that first diagonal lines D1 of the parallelogram patterns P are connected on the same line in the first direction. In addition, in the electrode 200, the above-described column patterns F may be continuously arranged in a direction perpendicular to the first direction, that is, a width direction in FIG. 2.

Hereinafter, for convenient explanation, column patterns F of the electrode 200 will be designated as a first column pattern F1, a second column pattern F2, a third column pattern F3, and the like, starting from the column pattern F that is disposed at an end of either side of the electrode 200, for example, at the left side of the electrode 200.

The wiring 310 is electrically connected to the electrode 200, and serves to transmit a touch signal generated from the electrode 200 to the controller. As for the wiring 310, one end portion thereof may be connected to the electrode 200, and the other end portion thereof may be located in the non-active area 102 of the transparent substrate 100, as shown in FIG. 1. In addition, a flexible printed circuit board (FPCB) connected to the controller may be electrically connected to the other end portion of the wiring 310.

Meanwhile, in the case where the electrode is formed in a mesh pattern, the wiring can not be disposed in the active area 101 of the transparent substrate if the wiring connected to the electrode is formed in a shape of straight line like the structure of the touch panel of the prior art. The reason is that the shape of the wiring is not in uniform with the pattern of the electrode and thus visibility of the touch panel is deteriorated.

Therefore, there is no choice but to form the straight-line of wiring in the non-active area 102, which may cause the non-active area 102 of the touch panel of the prior art to be widened.

The present invention has objects of maintaining good visibility of the touch panel and reducing the non-active area 102 even though the wiring is disposed in the active area 101 of the transparent substrate 100, by forming the wiring and the electrode to have overall uniform patterns.

In order to achieve the above objects, in the present preferred embodiment, the wiring 310 is formed in a wavy pattern on the transparent substrate 100, as shown in FIG. 4. The reason the wiring 310 is formed in a wavy pattern is as follows.

When the first column pattern F1 as shown in FIG. 3 is cut in half, a left portion of the first column pattern F1 has a zigzag shape where mountains and valleys are continuously formed along the longitudinal direction. Therefore, in the case where the wiring 310 is formed in a shape close to the zigzag shape defined along the longitudinal direction of the left side of the first column pattern F1 and the wiring 310 is located in appropriate harmony with the mesh pattern of the electrode 200 on the transparent substrate 100, the electrode 200 and the wiring 310 can have overall uniform patterns. When the electrode 200 and the wiring 310 appear to have overall uniform patterns as described above, visibility of the touch panel can not be deteriorated even though the wiring 310 and the electrode 200 are formed together in the active area 101 of the transparent substrate 100.

In order to achieve this, the wiring 310 is formed in a wavy pattern close to the above-described zigzag shape. The wiring 310 is formed in a wavy pattern, and thus mountains and valleys alternately continuing along the longitudinal direction are formed. Here, one of the mountain and the valley becomes first peak 311 and the other becomes a second peak 312. The first peak 311 and the second peak 312 do not have an acute shape but a curve shape.

The wiring 310 may be formed at various positions on the transparent substrate 100 such that the wiring 310 makes a uniform pattern together with the electrode 200. As a specific example regarding the position of the wiring 310, the wiring 310 may be lengthily formed in the first direction on the transparent substrate 100 while the wiring 310 is disposed adjacent to the first column pattern F1 constituting the left side of the electrode 200.

Here, the wiring 310 may be connected to the first column pattern F1 of the electrode 200 by a separate connection line (not shown). Alternately, as shown in FIG. 4, the first peaks 311 of the wiring 310 facing toward the first column pattern F1 may be directly connected to the first column pattern F1. More specifically, in the parallelogram pattern P constituting the first column pattern F1, any one vertex Va of the vertexes positioned in a direction of the second diagonal line D2 (see, FIG. 2) is positioned close to the wiring 310. The first peak 311 of the wiring 310 is directly connected to this vortex Va, so that the wiring 310 can be connected to the electrode 200.

In addition, only any one of the plurality of first peaks 311 formed along the longitudinal direction of the wiring 310 may be connected to the first column pattern F1, or as shown in FIG. 4, the plurality of first peaks 311 may be connected to the plurality of vertexes Va of the first column pattern F1, respectively. In order to achieve this, the width W between the first peaks 311 of the wiring 310 may be equal to the width of the first diagonal line D1 of the parallelogram pattern P.

Meanwhile, the above-described electrode 200 and wiring 310 may be formed of a metal material having high electrical conductivity and easy processability. As the metal material, copper (Cu), aluminum (Al), gold (Au), silver (Ag), titanium (Ti), palladium (Pd), chrome (Cr), or a combination thereof may be used. The electrode 200 and the wiring 310 may be formed on the transparent substrate 100 by various methods such as a plating process, a depositing process, and the like, and here, the electrode 200 and the wiring 310 may be integrally formed.

Further, the electrode 200 and the wiring 310 may be formed of metallic silver formed by exposing/developing a silver salt emulsion layer besides the above-described metal.

Hereinafter, a second preferred embodiment of the present invention will be described with reference to the accompanying drawings. However, the descriptions overlapping the contents described in the first preferred embodiment will be omitted.

Figure 5:
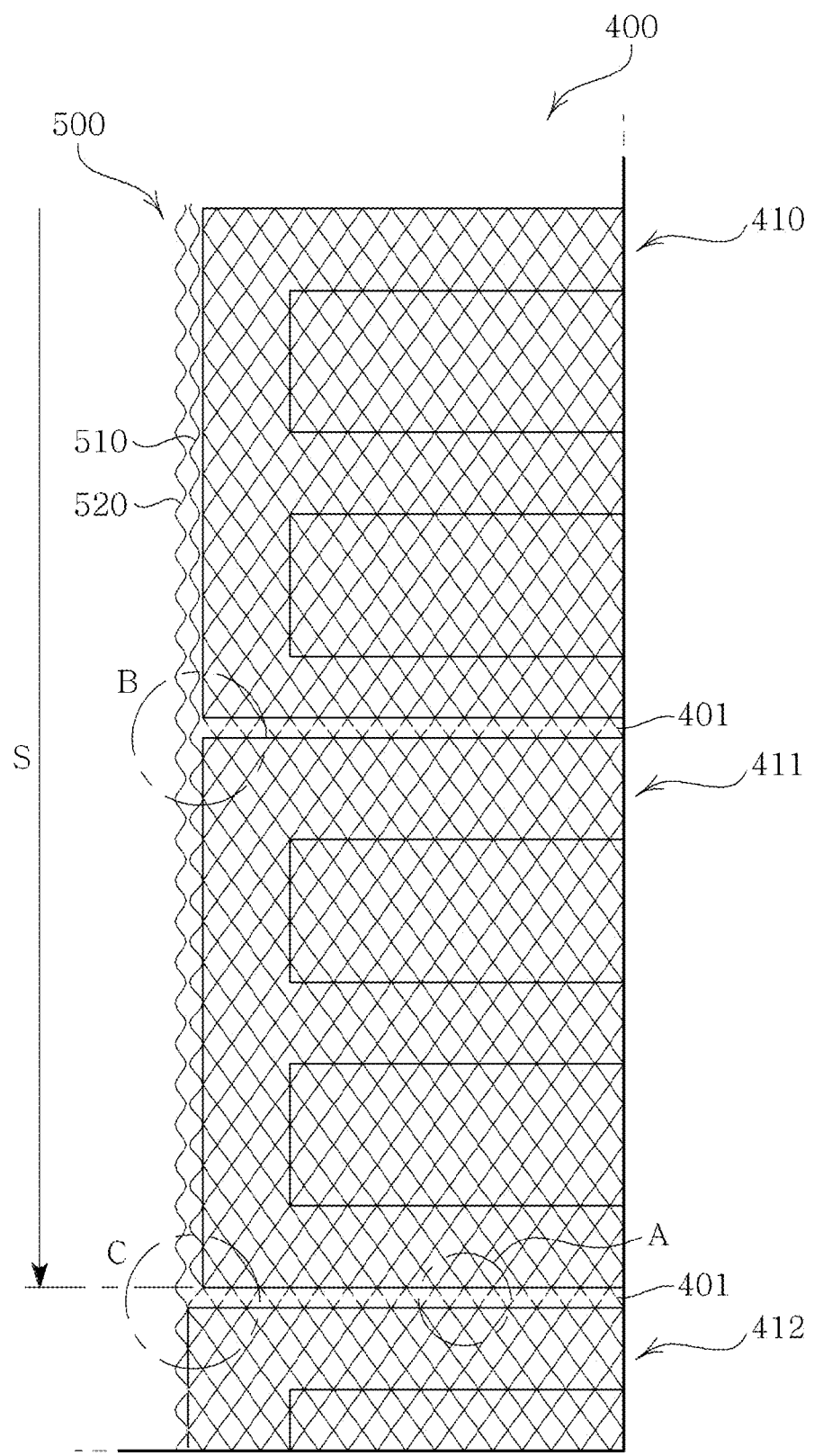
FIG. 5 is a plane view showing an electrode array and a wiring array of a touch panel according to a second preferred embodiment of the present invention.
Figure 6:
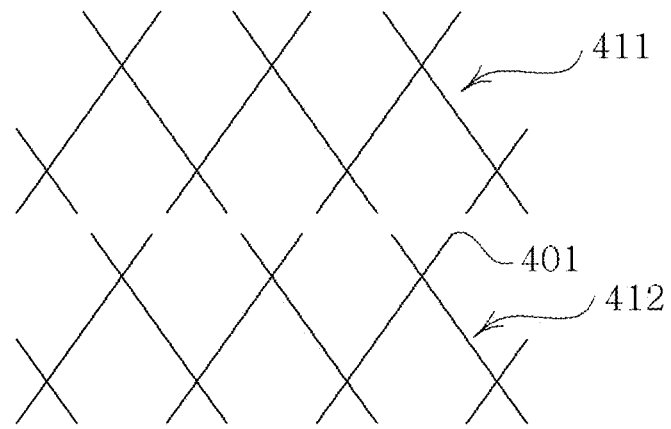
FIG. 6 is a main part enlarged view of Area A shown in FIG. 5.
Figure 7:
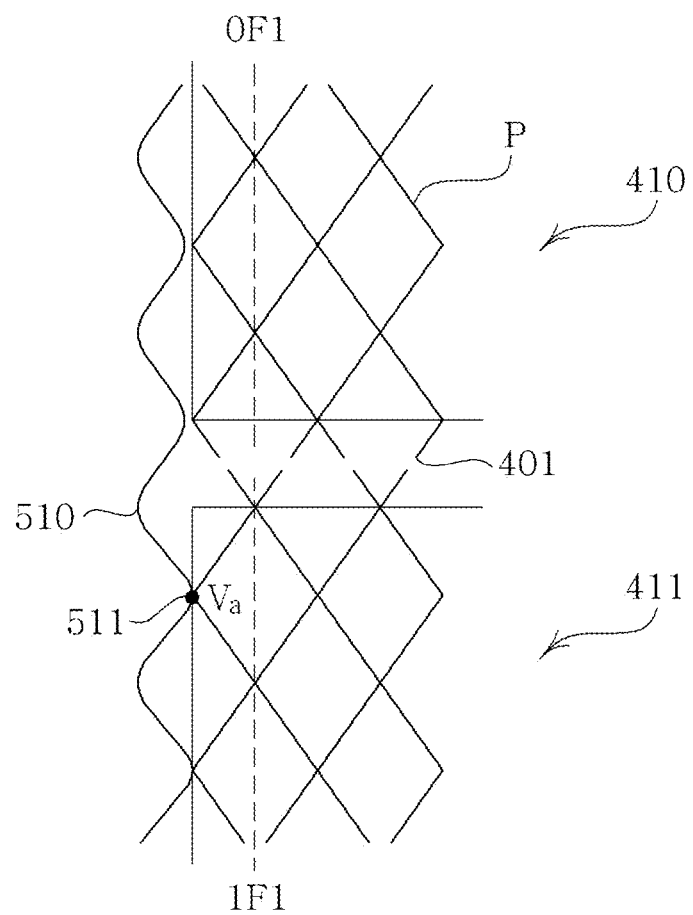
FIG. 7 is a main part enlarged view of Area B shown in FIG. 5.
Figure 8:
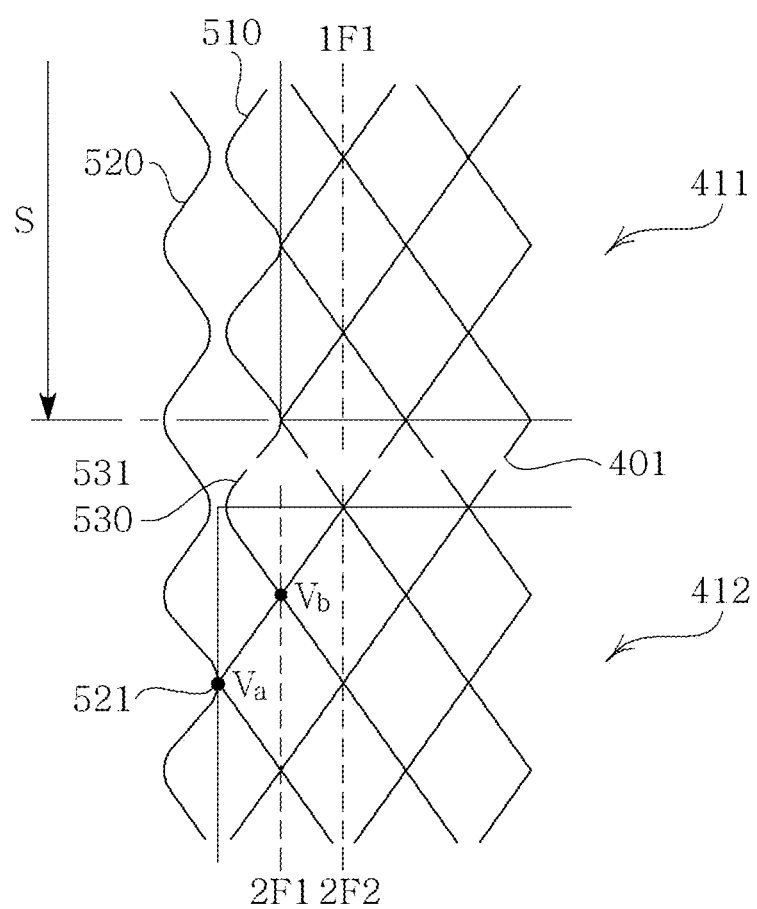
FIG. 8 is a main part enlarged view of Area C shown in FIG. 5.
Figure 9:
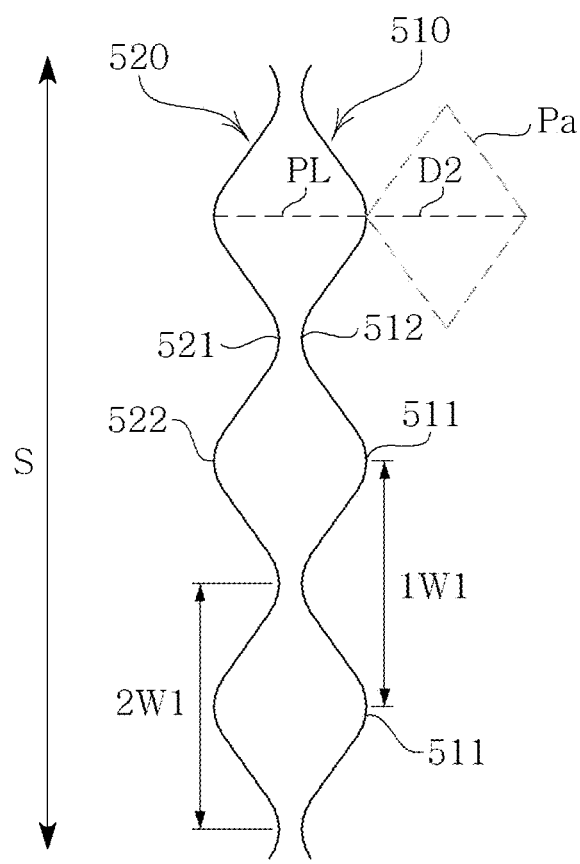
FIG. 9 is a main part enlarged view of the wiring array shown in FIG. 5.

FIG. 5 is a plane view showing an electrode array and a wiring array of a touch panel according to a second preferred embodiment of the present invention; FIG. 6 is a main part enlarged view of Area A shown in FIG. 5; FIG. 7 is a main part enlarged view of Area B shown in FIG. 5; FIG. 8 is a main part enlarged view of Area C shown in FIG. 5; and FIG. 9 is a main part enlarged view of the wiring array shown in FIG. 5.

As shown in FIGS. 5 to 9, a touch panel according to the present preferred embodiment may include a transparent substrate 100 (see, FIG. 1); an electrode array 400 formed in a mesh pattern on the transparent substrate 100 and demarcated into a first electrode 411 and a second electrode 412 by a cut portion 401 formed in the mesh pattern; and a wiring array 500 formed in a wavy pattern on the transparent substrate 100 and including a first wiring 510 and a second wiring 520 having curve shape of first peaks 511 and 521 and second peaks 512 and 522 that alternately continue along a longitudinal direction, the first wiring 510 being connected to the first electrode 411 and the second wiring 520 being connected to the second electrode 412.

As shown in FIG. 5, the electrode array 400 is formed in a mesh pattern on the transparent substrate 100. The mesh pattern of the electrode array 400 may account for a predetermined region in the active area 101 of the transparent substrate 100. In addition, this electrode array 400 may be formed in plurality, along a specific direction on the transparent substrate 100.

The cut portion 401 is formed in the mesh pattern of the electrode array 400, so that the electrode array 400 is demarcated into the first electrode 411 and the second electrode 412. Alternately, the electrode array 400 may be demarcated into three or more electrodes 410, 411, 412, ..., including the first electrode 411 and the second electrode 412.

FIG. 5 shows an example where the cut portion 401 is formed in the mesh pattern of the electrode array 400 along a width direction so that the electrode array is demarcated into the first electrode 411 and the second electrode 412. Here, the first electrode 411 and the second electrode 412 may be disposed in a longitudinal direction.

As shown in FIG. 6, the first electrode 411 and the second electrode 412 may be separated from each other since the mesh pattern formed between the first electrode 411 and the second electrode 412 is broken. The cut portion 401 means this broken portion.

The mesh pattern constituting the electrode array 400 is the same as the mesh pattern constituting the electrode 200 of Example 1. In addition, the electrodes 410, 411, and 412 into which the electrode array 400 is demarcated may have various outlines. The outline of the electrodes 410, 411, and 412 shown in FIG. 5 is merely one example of the present invention.

As described above, in the case where the electrode array 400 is demarcated into the first electrode 411 and the second electrode 412, the wiring array 500 may include the first wiring connected to the first electrode 411 and the second wiring 520 connected to the second electrode 412. Alternately, in the case where the electrode array 400 is demarcated into three or more electrodes including the first electrode 411 and the second electrode 412, the wiring array 500 may be composed of the first wiring 510 and the second wiring 520, or three or more wirings including the first wiring 510 and the second wiring 520.

For example, among the plurality of electrodes 410, 411, and 412 shown in FIG. 5, the electrode designated by a reference number 410 may be an outer electrode 410 disposed nearest adjacent to the non-active area 102 of the transparent substrate 100. In this case, a wiring connected to the outer electrode 410 needs not to be disposed adjacent to one side in a width direction of the outer electrode 410. The wiring connected to the outer electrode 410 is connected to one side of the outer electrode 410 facing toward the non-active area 102, to thereby be connected to the non-active area 102. Therefore, considering this outer electrode 410, the number of wirings included in the wiring array 500 may correspond to the number of electrodes except the outer electrode 410, among the electrodes 410, 411, and 412 included in the electrode array 400. FIG. 5 shows that the wiring connected to the outer electrode 410 is not formed at one side in the width direction of the outer electrode 410. In addition, it is shown that the wiring array 500 is composed of the first wiring 510 connected to the first electrode 411 and the second wiring 520 connected to the second electrode 412.

The first wiring 510 and the second wiring 520 are formed in a wavy pattern having curve shape of first peaks 511 and 521 and second peaks 512 and 522, like the wiring 310 (see, FIG. 4) described in the first preferred embodiment.

The first wiring 510 is connected to the first electrode 411 as shown in FIG. 7. The first wiring 510 may be disposed adjacent to a first column pattern 1F1 of the first electrode 411, and may be lengthily formed in a first direction, for example, a longitudinal direction. In addition, the first peak 511 of the first wiring 510 may be directly connected to a vertex Va adjacent to the first column pattern 1F1 of the first electrode 411. Here, an extended portion of the first wiring 510, which is disposed adjacent to a lateral side of a first column pattern 0F1 of the outer electrode 410, is separated from the outer electrode 410.

The second wiring 520 is connected to the second electrode 412 as shown in FIG. 8. The second wiring 520 may be disposed adjacent to a first column pattern 2F1 of the second electrode 412 and may be lengthily formed in a longitudinal direction. Also, the first peak 521 of the second wiring 520 may be directly connected to a vertex Va adjacent to a first column pattern 2F1 of the second electrode 412, like in the first wiring 510.

Here, the second wiring 520 is lengthily formed in parallel with the length direction of the first wiring 510. The first column pattern 2F1 of the second electrode 412 is protruded further than the first column pattern 1F1 of the first electrode 411 in the width direction so that the second wiring 520 does not overlap the first wiring 510. That is, the second column pattern 2F2 of the second electrode 412 may be on the same line as the first column pattern 1F1 of the first electrode 411. In this case, a left side of the second electrode 412 is protruded further than a left side of the first electrode 411 in a left direction by about the half the width of the column pattern F. Therefore, the second wiring 520 is directly connected to the first column pattern 2F1 of the second electrode 412, and may be formed in parallel with the first wiring 510 without overlapping, even though the second wiring 520 is lengthily formed in the longitudinal direction.

Meanwhile, reference number 530 shown in FIG. 8 denotes a connection pattern connected from an end portion of the first wiring 510 to a vertex Vb of the parallelogram pattern P that is positioned at the uppermost side of the first column pattern 2F1 of the second electrode 412. As described above, the left side of the second electrode 412 is protruded further than the left side of the first electrode 411 in the left direction, and thus, a pattern discontinuity space may be formed between the end portion of the first wiring 510 and the first column pattern 2F1 of the second electrode 412. This space may be a factor of deteriorating visibility of the touch panel. Therefore, the connection pattern 530 is formed at the end portion of the first wiring 510 to have a shape where the pattern of the first wiring 510 continues, and this connection pattern 530 is connected to the vortex Vb of the parallelogram pattern P of the first column pattern 2F1 of the second electrode 412, so that the electrode array 400 and the wiring array 500 have overall uniform patterns without formation of the above-described space. Here, the cut portion 531 may be formed in the connection pattern 530 to thereby insulate the first wiring 510 and the second electrode 412 from each other, as shown in FIG. 8.

In the first wiring 510 and the second wiring 520, the plurality of first peaks 511 and 521 may correspond to and be directly connected to the plurality of vortexes Va of the first column patterns 1F1 and 2F1, respectively, as shown in FIGS. 7 and 8. In order to achieve this, the width 1W1 (see, FIG. 9) between the first peaks 511 of the first wiring 510 and the width 2W1 (see, FIG. 9) between the first peaks 521 of the second wiring 520 are equal to the width of the first diagonal line D1 of the parallelogram pattern P.

Meanwhile, a neighboring section S where the first wiring 510 and the second wiring 520 are disposed in parallel with each other while neighboring each other may be formed on the transparent substrate 100, as shown in FIGS. 8 and 9.

Here, in the neighboring section S, the second peaks 512 of the first wiring 510 and the first peaks 521 of the second wiring 520 face each other, but may be separated from each other to thereby be insulated from each other.

Since the first and second wirings 510 and 520 are formed in a wavy pattern and the vortexes of the first peaks 511 and 521 and the second peaks 512 and 522 have a curve shape but not an acute shape, a space where the second peaks 512 of the first wiring 510 and the first peaks 521 of the second wiring 520 are separated from each other can be secured even though the first and second wirings 510 and 520 are disposed adjacent to each other in order to form a pattern close to a parallelogram pattern P in the neighboring section S.

Meanwhile, preferably, the pattern of the neighboring section S defined by the first wiring 510 and the second wiring 520 preferably appears overall uniform with the mesh pattern constituting the electrode array 400.

Therefore, in the case where the width 1W1 between the first peaks 511 of the first wiring 510 and the width 2W1 between the first peaks 521 of the second wiring 520 are equal to the width of the first diagonal line D1 of the parallelogram pattern P and the second peaks 512 of the first wiring 510 and the first peaks 521 of the second wiring 520 face each other in the neighboring section S, as described above, the distance of a straight-line PL of connecting the first peak 511 of the first wiring 510 and the second peak 522 of the second wiring 520 may be equal to the width of the second diagonal line D2 of the parallelogram pattern P in the neighboring section S, as shown in FIG. 9. In addition, the direction of the straight-line PL may be identical to the direction of the second diagonal direction D2 of the parallelogram pattern Pa disposed facing toward the direction of this straight line PL.

The wiring array 500 is formed as described above, and thus, the neighboring section S exhibits a shape where patterns close to the parallelogram pattern P are continuously arranged in the longitudinal direction by the first wiring 510 and the second wiring 520. Therefore, the wiring array 500 and the electrode array 400 may appear to have overall uniform patterns. The touch panel can maintain good visibility even though the wiring array 500 and the electrode array 400 are formed together in the active area 101 of the transparent substrate 100.

Meanwhile, in the present preferred embodiment, the mesh pattern constituting the electrode array 400 and the pattern constituting the wiring array 500 may be formed of the same material, like in the first preferred embodiment. Specific material and forming method thereof have been previously described in Example 1, and thus, descriptions thereof will be omitted.

Hereinafter, a third preferred embodiment of the present invention will be described with reference to the accompanying drawing. However, the descriptions overlapping the contents described in the first and second preferred embodiments will be omitted.

Figure 10:
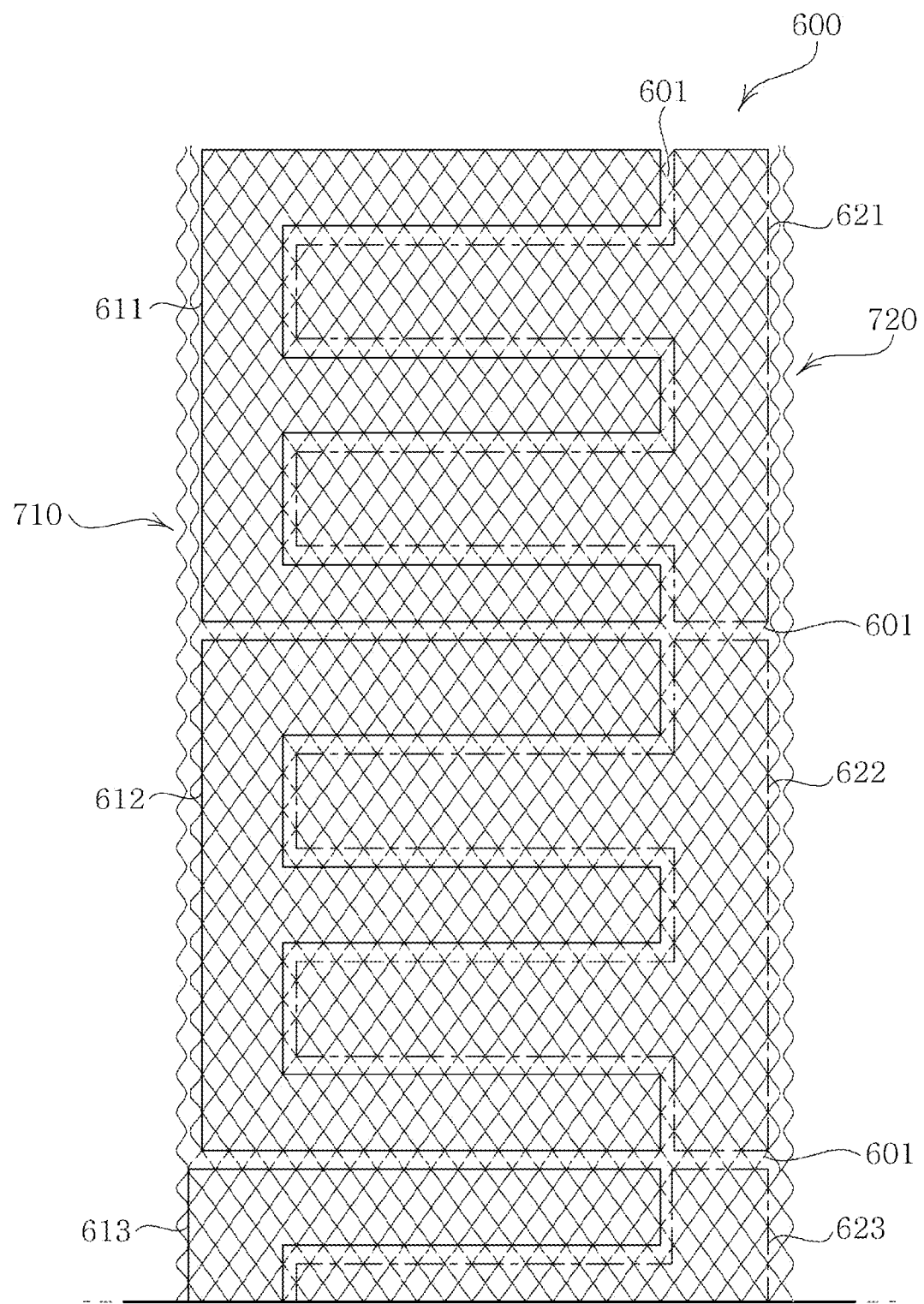
FIG. 10 is a plane view showing an electrode array and a wiring array of a touch panel according to a third preferred embodiment of the present invention.

FIG. 10 is a plane view showing an electrode array and a wiring array of a touch panel according to a third preferred embodiment of the present invention.

An electrode array of the present preferred embodiment is demarcated into a plurality of electrodes while cut portions 601 are formed in a mesh pattern. Here, the present preferred embodiment is different from the second preferred embodiment in that the electrode array 400 is demarcated into a plurality of X electrodes 611, 612, 613, . . . disposed in one line in a longitudinal direction and a plurality of Y electrodes 621, 622, 623, . . . disposed in one line in the longitudinal direction.

The wiring array includes a plurality of X wirings 710 connected to the plurality of X electrodes 611, 612, 613, . . . and a plurality of Y wirings 720 connected to the plurality of Y electrodes 621, 622, 623, . . . . Here, the X wirings 710 are disposed at one side in a width direction of the X electrodes 611, 612, 613, . . . and connected to all or some of the X electrodes 611, 612, 613, . . . , and the Y wirings 720 are disposed at the other side in the width direction of the Y electrodes 621, 622, 623, . . . and connected to all or some of the Y electrodes 621, 622, 623, . . . .

The structure where the plurality of X wirings 710 and the plurality of Y wirings 720 are connected to the plurality of X electrodes 611, 612, 613, . . . , and the plurality of Y electrodes 621, 622, 623, . . . , respectively, can be understood by descriptions of the connection structures of the electrodes 411 and 412 and the wirings 510 and 520 in Example 2, and thus, hereinafter, detailed descriptions thereof will be omitted.

In the present preferred embodiment, the plurality of X electrodes 611, 612, 613, . . . , constituting the electrode array may be used as a sensing electrode and the plurality of Y electrodes 621, 622, 623, . . . , constituting the electrode array may be used as a driving electrode.

In the present preferred embodiment, the electrode array and the wiring array are formed in the active area 101 of the transparent substrate 100 (see, FIG. 1) as described above, and thus, the electrode array and the wiring array have overall uniform patterns.

In addition, the plurality of electrode arrays and wiring arrays as described above are formed in the active area 101 of the transparent substrate 100, and thus, the plurality of electrode arrays and the plurality of wiring arrays can have overall uniform patterns even though the electrode arrays and the wiring arrays are formed adjacent to each other in a specific direction.

As can be seen from the above-described preferred embodiments of the present invention, the electrodes and wirings or the electrode array and wiring array are seen to have a uniform pattern overall, and thus, the wiring or wiring array can be disposed together with the electrode or electrode array in the active area of the transparent substrate and as a result, the non-active area of the transparent substrate can be reduced.

As set forth above, the wiring or wiring array has a pattern that appears generally uniform together with the electrode or the electrode array while being in harmony with the mesh pattern constituting the electrode or electrode array. Therefore, according to the present invention, visibility of the touch panel is excellent even though the wiring or wiring array is disposed in the active area of the transparent substrate.

Further, due to the above advantages, the non-active area of the transparent substrate can be reduced, and thereby the width of the bezel part of the touch panel can be decreased. Therefore, the structure of the touch panel can be minimized or a screen area of the touch panel can be further widened as compared with those of touch panels having the same area.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A touch panel, comprising:
    a transparent substrate;
    an electrode array disposed on an active area of the transparent substrate; and
    a wiring array;
    wherein the electrode array has at least two electrodes including first and second electrodes disconnected to each other and arranged in a first direction, and each of the first and second electrodes includes a plurality of column patterns continuously arranged, each of the column patterns having parallelogram patterns continuing along the first direction, and
    the wiring array has at least two wirings including first and second wirings arranged in parallel with each other along the first direction and each other of the first and second wirings has a zigzag shape where a first peak and a second peak are formed alternatively and continuously, and the first wiring has a first portion connected to one side of the first electrode and second portion disconnected to the first portion and connected to one side of the second electrode, and the second wiring is disconnected to the first portion of the first wiring and connected to one side of the second electrode via the second portion of the first wiring.

2. The touch panel as set forth in claim 1, wherein the wiring array has a width between the first peaks substantially equal to the width of a first diagonal line of the parallelogram pattern.

3. The touch panel as set forth in claim 2 wherein the first peak of the first wiring is connected to a vertex of the parallelogram pattern on the sides of the first and second electrodes.

4. A touch panel, comprising:
    a transparent substrate;
    an electrode array disposed on an active area of the transparent substrate and including X and Y electrode arrays disconnected to each other, each having a mesh pattern where parallelogram patterns are continuously arranged; and
    a wiring array including X and Y wiring arrays, each having a zigzag shape where a first peak and a second peak are formed alternatively and continuously,
    wherein the X electrode array has at least two X electrodes including the first and second X electrodes electrically disconnected to each other and arranged in a first direction, and the Y electrode array has a at least two Y electrodes including first and second Y electrodes electrically disconnected to each other and arranged in a first direction,
    the X wiring array has at least two X wirings including first and second X wirings in parallel with each other along the first direction on one side of the X electrode, and the Y wiring array has at least two Y wirings including first and second Y wirings arranged in parallel with each other along the first direction on one side of the Y electrode, and
    each of the first X and Y wirings has a first portion connected to one side of each of the first X and Y electrodes and a second portion disconnected to the first portion and connected to one side of each of the second X and Y electrodes, and the second X and Y wirings are disconnected to the first portions of the first X and Y wirings and connected to the second portions of the first X and Y wiring to electrically connect to the one side of the side of the second electrode, respectively.

5. The touch panel as set forth in claim 4, a distance of a straight-line of connecting the first peak of the first wiring and the second peak of the second wiring is equal to a width of a second diagonal line of the parallelogram pattern.

6. The touch panel as set forth in claim 4, wherein the X and Y electrodes arrays are disposed on a same level.

7. The touch panel as set forth in claim 4, wherein the first peak of each of first X and Y wirings is electrically connected to a vertex of the parallelogram pattern on one side of each of the first and second electrode arrays, respectively.

8. The touch panel as set forth in claim 7, wherein the second peak of each of second X and Y wirings is electrically connected to the second portions of each of the first X and Y wirings, respectively.

* * * * *